(12) United States Patent
Wright et al.

(10) Patent No.: US 7,613,806 B2
(45) Date of Patent: Nov. 3, 2009

(54) SYSTEM AND METHOD FOR MANAGING REPLICATION SETS OF DATA DISTRIBUTED OVER ONE OR MORE COMPUTER SYSTEMS

(75) Inventors: Michael H. Wright, Franklin, MA (US); John E. Stockenberg, Newport, RI (US)

(73) Assignee: EMC Corporation, Hopkinton, MA (US)

( * ) Notice: Subject to any disclaimer, the term of this patent is extended or adjusted under 35 U.S.C. 154(b) by 509 days.

(21) Appl. No.: 09/894,422

(22) Filed: Jun. 28, 2001

(65) Prior Publication Data
US 2003/0172157 A1 Sep. 11, 2003

(51) Int. Cl.
G06F 15/173 (2006.01)

(52) U.S. Cl. .................................................. 709/225

(58) Field of Classification Search ............... 707/100, 707/204; 709/248, 223–226, 246–247; 711/114
See application file for complete search history.

(56) References Cited

U.S. PATENT DOCUMENTS

| | | | |
|---|---|---|---|
| 5,206,939 A | | 4/1993 | Yanai et al. |
| 5,497,492 A * | | 3/1996 | Zbikowski et al. ............. 713/2 |
| 5,513,192 A | | 4/1996 | Janku et al. |
| 5,784,548 A | | 7/1998 | Liong et al. |
| 5,889,935 A | | 3/1999 | Ofek et al. |
| 5,928,367 A | | 7/1999 | Nelson et al. |
| 6,023,584 A * | | 2/2000 | Barton et al. ............ 717/177 |
| 6,047,294 A | | 4/2000 | Deshayes et al. |
| 6,101,497 A | | 8/2000 | Ofek |
| 6,493,729 B2 * | | 12/2002 | Gusler et al. ............... 707/204 |
| 6,535,891 B1 * | | 3/2003 | Fisher et al. ................ 707/203 |
| 6,567,811 B1 * | | 5/2003 | Edwards et al. ............. 707/100 |
| 6,574,591 B1 * | | 6/2003 | Kleiman et al. ............. 707/203 |
| 6,604,118 B2 * | | 8/2003 | Kleiman et al. ............. 707/203 |
| 6,681,290 B2 * | | 1/2004 | Brower et al. ............... 711/114 |
| 6,714,953 B2 * | | 3/2004 | Grubbs et al. ............... 707/205 |
| 6,714,980 B1 * | | 3/2004 | Markson et al. ............. 709/226 |
| 6,757,698 B2 * | | 6/2004 | Davidson et al. ............ 707/204 |
| 6,959,360 B2 * | | 10/2005 | Murotani et al. ............ 711/114 |
| 7,010,584 B1 * | | 3/2006 | Craft .......................... 709/220 |

(Continued)

OTHER PUBLICATIONS

Baru et al., Data reorganization in parallel database systems, IEEE, 1993, p.102-107.*

(Continued)

*Primary Examiner*—Vivek Srivastava
*Assistant Examiner*—Thomas Duong
(74) *Attorney, Agent, or Firm*—Daly, Crowley, Mofford & Durkee, LLP (57) ABSTRACT

This invention is a system and method for managing replication of data distributed over one or more computer systems. The method includes the computer-executed steps of establishing one or more mirrored copies of data that are copies of one or more volumes of standard data (e.g. a database) on a first computer system. The mirrored copies of data are separated or split from the standard data. A map is created relating logical information to physical devices on the first computer system. Then a duplicate of the one or more mirrored copies of data is mounted on the second computer system by using the map to create another volume group on the second computer. It is substantially identical to the first volume group. The first and second computer may be integrally combined.

39 Claims, 9 Drawing Sheets

U.S. PATENT DOCUMENTS

| | | | |
|---|---|---|---|
| 7,167,960 B2 * | 1/2007 | Kodama et al. | 711/162 |
| 7,233,985 B2 * | 6/2007 | Hahn et al. | 709/222 |
| 7,404,053 B2 * | 7/2008 | Kodama et al. | 711/162 |
| 2002/0078296 A1 * | 6/2002 | Nakamura et al. | 711/114 |
| 2002/0103889 A1 * | 8/2002 | Markson et al. | 709/223 |
| 2006/0031649 A1 * | 2/2006 | Murotani et al. | 711/162 |

OTHER PUBLICATIONS

International Search Report for PCT/US02/16871 dated Sep. 11, 2002.

IPER for PCT/US02/16871 dated Oct. 22, 2003.

Response to Written Opinion for PCT/US02/16871 dated Jun. 30, 2003.

* cited by examiner

SYSTEM AND METHOD FOR MANAGING REPLICATION SETS OF DATA DISTRIBUTED OVER ONE OR MORE COMPUTER SYSTEMS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to managing data in a data storage environment, and more particularly to a system and method for managing replication of data distributed over one or more computer systems.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

The EMC Data Manager (EDM) is capable of such backup and restore over a network, as described in numerous publications available from EMC of Hopkinton, Mass., including the EDM User Guide (Network) "Basic EDM Product Manual". For performance improvements, a backup storage architecture in which a direct connection is established between the shared storage system and the backup storage system was conceived. Such a system is described in U.S. Pat. No. 6,047,294, assigned to assignee of the present invention, and entitled Logical Restore from a Physical Backup in Computer Storage System and herein incorporated by reference.

Today much of the data processing and storage environment is dedicated to the needs of supporting and storing large databases, which only get larger. Although data storage systems, such as the EMC Symmetrix Integrated Cache Disk Array, and some of its supporting software such as TimeFinder have made general advancements in the data storage art through the advanced use of disk mirroring much of the capability of such technology is beyond the grasp of most entities. This is because of an ever-increasing shortage of skilled computer professionals. Typically, an entity such as a company might employ or contract a data storage administrator to take care of data storage needs, a database programmer to take of database needs and general network administrators and other information technology professionals to take care of general computing needs.

If one of these skilled professionals leaves or is difficult to hire then the task of storing a database and taking care of its backup and restore needs may be neglected or never happen in the first place. What is needed is a computer-based tool, such as a system or program that could automate many of these tasks and reduce the complexity so that such a wide array or depth of skill sets are not needed. Further it would be an advantage if such a tool provided solutions for disaster recovery of data.

Prior art systems have allowed for restoration of source or standard data from replicated copies, but there has been no straight-forward simple way to get logical information related to the source so that another computer could take over the role of a failed computer (i.e., serve as a surrogate for the failed computer). There is a long-felt need for a technique to enable extraction of such logical information in a straight-forward non-complex and fast manner so that a surrogate computer could work with replicated copies in substantially the same manner as the original source computer that had operated with standard data. This would be advancement in the art with particular relevance in the field of disaster recovery.

SUMMARY OF THE INVENTION

The present invention is a system and method for management of data replicated across one or more computer systems.

The method of this invention allows management of data that may be replicated across one or more computer systems. The method includes the computer-executed steps of establishing one or more mirrored copies of data that are copies of one or more volumes of data that are part of a first volume group on a first computer system. The mirrored copies of data are separated or split from the respective one or more volumes of data. Steps include the discovering of logical information related to the one or more volumes of data that are part of the volume group on the first computer system.

A map is created from the discovered information to map logical information to physical devices on the first computer system. Then a duplicate of the one or more mirrored copies of data is mounted on the second computer system by using the map to create a second volume group that is substantially identical to the first volume group.

In an alternative embodiment, the invention includes a system for carrying out method steps. In another alterative embodiment, the invention includes a program product for carrying out method steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to methods and apparatus for use in systems of this type that include transferring a mirrored set of data from a standard device to a redundant device for use in applications such as backup or error recovery, but which is not limited to such applications.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIGS. 1. One aspect of the invention is embodied as a method that is described below with detailed specificity in reference to FIGS. 5-12.

Data Storage Environment Including Logic for this Invention

Figures 1, 2:
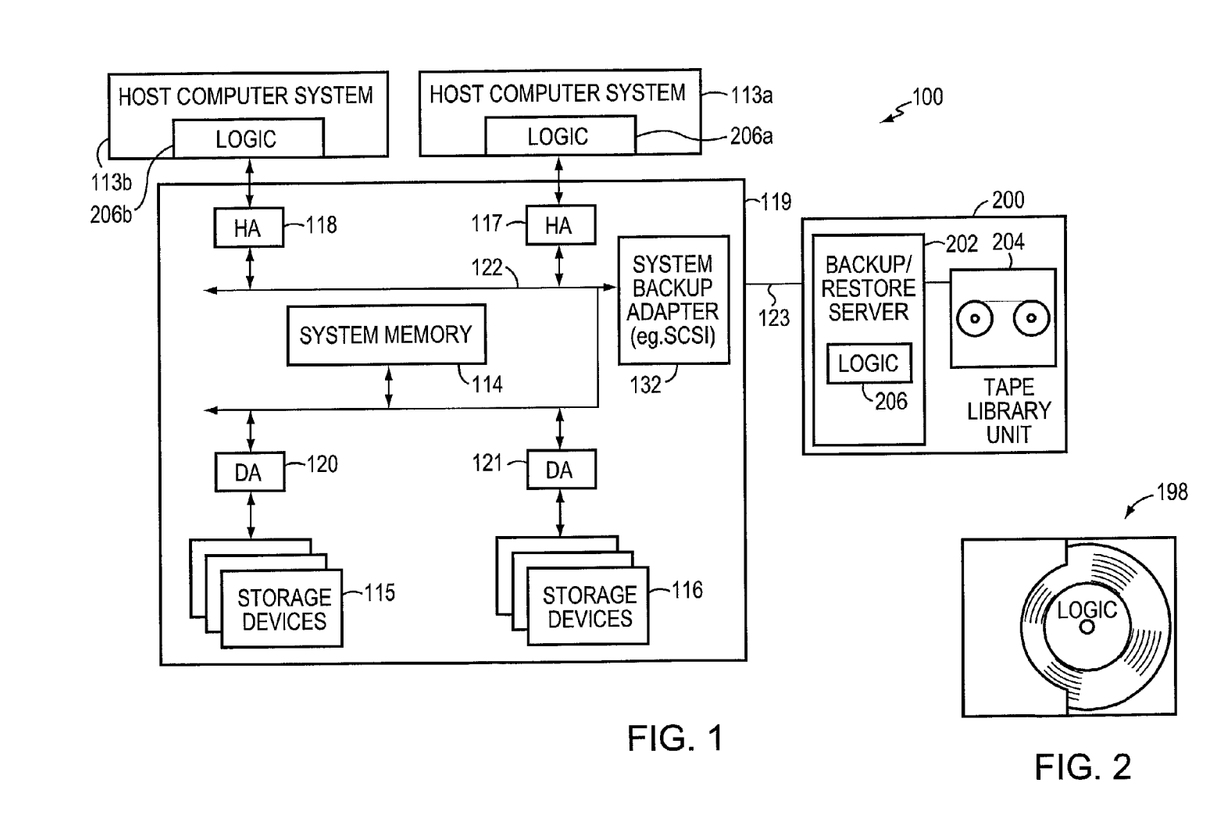
FIG. 1 is a block diagram of a data storage network including host computer systems a data storage system and a backup system and also including logic for enabling the method of the present invention.
FIG. 2 is an exemplary representation of a computer-readable medium encoded with the logic of FIG. 1 for enabling the method of the present invention.

Referring now to FIG. 1, reference is now made to a data storage network 100 in which the invention is particularly useful and includes a data storage system 119, host computer systems 113a and 113b, and backup system 200.

In a preferred embodiment the data storage system is a Symmetrix Integrated Cache Disk Arrays available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

The invention is useful in an environment wherein replicating to a local volume denoted as a business continuance volume (BCV) is employed (FIG. 2). Such a local system which employs mirroring for allowing access to production volumes while performing backup is also described in the '497 patent incorporated herein.

The data storage system 119 includes a system memory 114 and sets or pluralities 115 and of multiple data storage devices or data stores. The system memory 114 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations.

A host adapter (HA) 117 provides communications between the host system 113 and the system memory 114; disk adapters (DA) 120 and 121 provide pathways between the system memory 114 and the storage device pluralities 115 and 116. A bus 122 interconnects the system memory 114, the host adapters 117 and 118 and the disk adapters 120 and 121. Each system memory 114 is used by various elements within the respective systems to transfer information and interact between the respective host adapters and disk adapters.

A backup storage system 200 is connected to the data storage system 119. The backup storage system is preferably an EMC Data Manager (EDM) connected to the data storage system as described in Symmetrix Connect User Guide, P/N 200-113-591, Rev. C, December 1997, available from EMC Corporation of Hopkinton, Mass. The direct connection between the shared storage system and the backup storage system may be provided as a high-speed data channel 123 such as a SCSI cable or one or more fiber-channel cables. In this system, a user may be permitted to backup data over the network or the direct connection.

Backup system 200 includes a backup/restore server 202, Logic 206 as part of the server, and a tape library unit 204 that may include tape medium (not shown) and a robotic picker mechanism (also not shown) as is available on the preferred EDM system.

Logic 206 is installed and becomes part of the EDM for carrying out the method of this invention and the EDM becomes at least part of a system for carrying out the invention. Logic 206 is preferably embodied as software for carrying out the methods of this invention and is preferably included at least as part of a backup/restore server 202 in communication with the data storage system 119 through an adapter 132 (e.g., a SCSI adapter) along communication path 123. Substantially identical logic may also be installed as software on any host computer system such as 113a or 113b, shown as logic 206a and 206b, respectively. In a preferred embodiment the software is Unix-based and daemons are launched by the software for execution where needed on the backup system, or host computers. The deamons on each of these computers communicate through sockets.

The Logic of this invention, in a preferred embodiment is computer program code in the Perl programming language. As shown in FIG. 2, it may be carried out from a computer-readable medium such as CD-ROM 198 encoded with Logic 206 that acts in cooperation with normal computer electronic memory as is known in the art. Perl is a Unix-based language (see e.g. Programming Perl, 2nd Edition by Larry Wall, Randal I. Shwartz, and Tom Christiansen, published by O'Reilly and Associates). Nevertheless, one skilled in the computer arts will recognize that the logic, which may be implemented interchangeably as hardware or software may be implemented in various fashions in accordance with the teachings presented now.

Generally speaking, the data storage system 119 operates in response to commands from one or more computer or host systems, such as the host systems 113a and 113b, that are each connected via a host adapter, such as host adapters 117 and 118. The host adapters 117 and 118 transfer commands to a command buffer that is part of system memory 114. The command buffer stores data structures and write requests that the disk adapters generate. The disk adapters, such as the disk adapters 120 or 121, respond by effecting a corresponding operation using the information in a command buffer. The selected disk adapter then initiates a data operation. Reading operations transfer data from the storage devices to the system memory 114 through a corresponding disk adapter and subsequently transfer data from the system memory 114 to the corresponding host adapter, such as host adapter 117 when the host system 113a initiates the data writing operation.

The computer systems 113a and 113b may be any conventional computing system, each having an operating system, such as a system available from Sun Microsystems, and running the Solaris operating system (a version of Unix), an HP system running HP-UX (a Hewlett-Packard client, running a Hewlett-Packard version of the Unix operating system) or an IBM system running the AIX operating system (an IBM version of Unix) or any other system with an associated operating system such as the WINDOWS NT operating system.

A short description of concepts useful for understanding this invention and known in the art is now given. A physical disk is formatted into a "physicyal volume" for use by the management software such Logical Volume Manager (LVM) software available from EMC. Each physical volume is split up into discrete chunks, called physical partitions or physical extents. Physical volumes are combined into a "volume group." A volume group is thus a collection of disks, treated as one large storage area. A "logical volume" consists of some number of physical partitions/extents, allocated from a single volume group. A "filesystem" is simply stated a structure or a collection of files. In Unix, filesystem can refer to two very distinct things: the directory tree or the arrangement of files on disk partitions.

Below is a short description of other useful terminology which may be understood in more detail with reference to the incorporated '497 patent. When a mirror is "established" the data storage system 119 creates a mirror image (copy or replication) of a source or standard volume. When using the preferred Symmetrix such a mirror is denoted as a business continuance volume (BCV), also referred to in general terms as a mirrored disk. and in such a context specifically as a BCV device. If data on the standard volume changes, the same changes are immediately applied to the mirrored disk. When a mirror is "split" the preferred Symmetrix data storage system 119 isolates the mirrored version of the disk and no further changes are applied to the mirrored volume. After a split is complete, the primary disk can continue to change but the mirror maintains the point-in-time data that existed at the time of the split.

Mirrors can be "synchronized" in either direction (i.e., from the BCV to the standard or visa versa). For example, changes from the standard volume that occurred after a split to the mirror can be applied to the BCV or mirrored disk. This brings the mirrored disk current with the standard. If you synchronize in the other direction you can make the primary disk match the mirror. This is often the final step during a restore.

The operation of a BCV device and its corresponding BCV volume or volumes is more readily understood in terms of data sets stored in logical volumes and is useful for understanding the present invention. As known, any given logical volume may be stored on a portion or all of one physical disk drive or on two or more disk drives.

Figure 3:
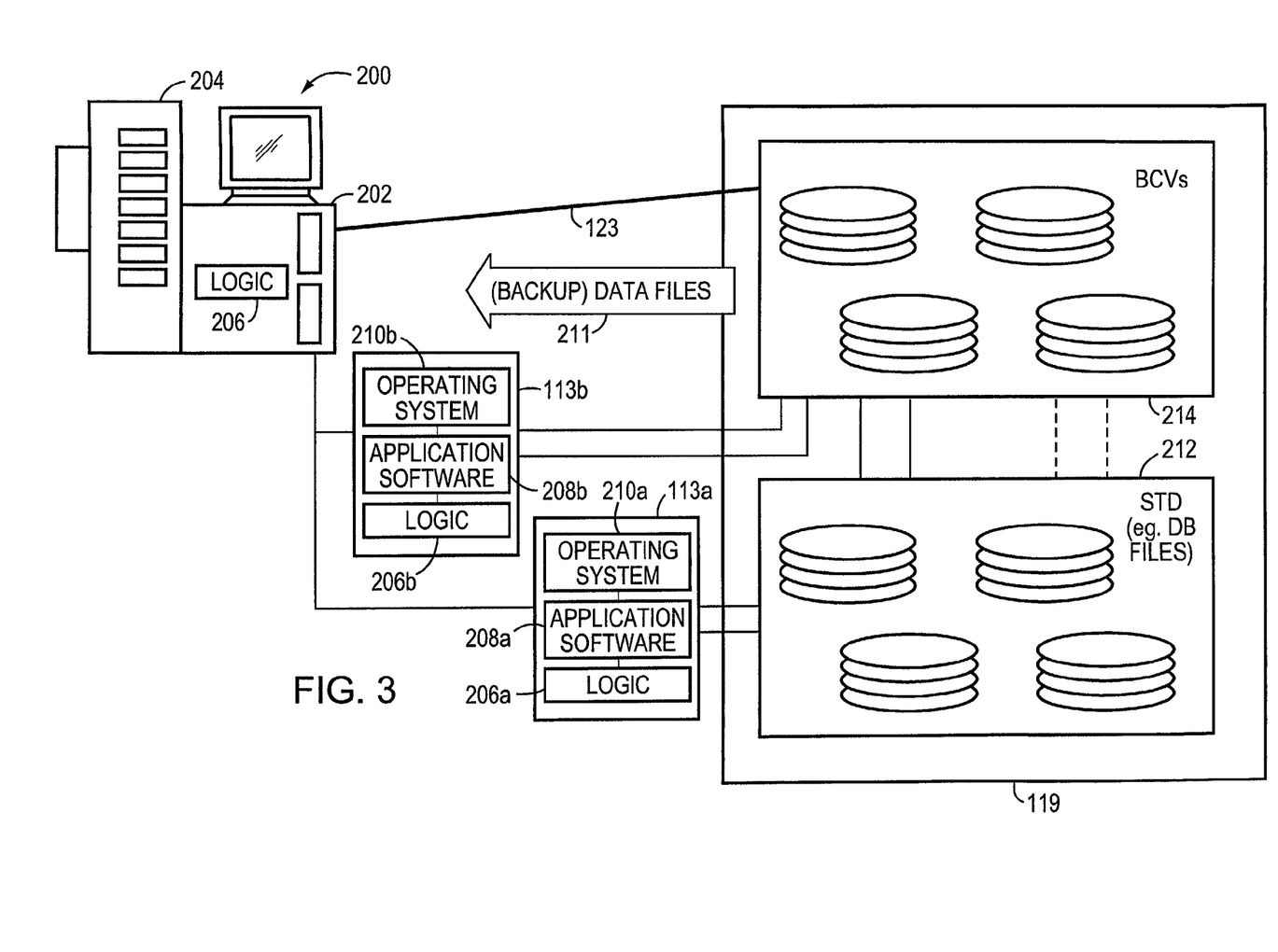
FIG. 3 is a schematic representation of the data storage network of FIG. 1 in which the invention may be configured to operate with standard and BCV devices for implementing the method of this invention.

Referring to FIG. 3, in this particular embodiment, disk adapter 120 (FIG. 1) controls the operations of a series of physical disks 115 that are shown in FIG. 3 in terms of logical volumes 212. The segmentation or hypering of physical disks into logical volumes is well known in the art.

Similarly a disk adapter interfaces logical volumes 214 to the data storage system bus 122 (FIG. 1). Each of these volumes 214 is defined as a Business Continuation Volume and is designated a BCV device. The concept of BCV's are described in detail in the incorporated '497 patent so will be only generally described herein. Each BCV device comprises a standard disk controller and related disk storage devices as shown in FIG. 1 especially configured to independently support applications and processes. The use of these BCV devices enables a host such as host 113a, described from here on as the "source" host computer system to utilize instantaneous copies of the data in the standard volumes 212. In a conventional operations there typically will be at least one BCV volume assigned to each host device that will operate on a data set concurrently. However, as will be explained below, this invention, in particular logic 206 and its counterparts 206a and 206b add additional function so that the BCV volumes established for use by one host may be used by another host, such as host 113b, described from here on as the "target" host computer system.

Although the invention has particular advantages when the target and source host computer system are separate distinct computers, there may also be advantages in having the two combined together. Thus, the target and source computer may be integrally combined as one computer.

Referring again to FIG. 3, host 113a may continue online transaction processing (such as database transaction processing) or other processing without any impact or load on the volumes 212, while their respective mirror images on BCV's 214 are used to back up data in cooperation with backup system 200. However using the Logic of this invention the BCV's may be established for use on another host substantially automatically under control of a computer program, rather than requiring intervention of an operator all along the way. The advantages and details associated with such an operation are described below.

The direction of data flow for backup is from the data storage system 119 to the backup system 200 as represented by arrow 211. The direction of data flow for restore is to the data storage system (opposite from arrow 211), but the BCV's may be mounted on another host other than the one originally established in accordance with the method of this invention.

The EDM normally offers several options for controlling mirror behavior before and after a backup or restore, which are incorporated with this invention and are therefore discussed now at a high level. (Further detail about such known polices may be found in a white paper available from EMC: Robert Boudrie and David Dysert, *EMC Best Practices: Symmetrix Connect and File Level Granularity*.)

Pre-Backup Mirror Policy

Bring Mirrors Down—This option expects to find the mirrors established and it will split the mirrors automatically before the backup. If the mirrors are down already, the backup will fail and report an error. The error is designed to prevent the system from backing up mirrors that are in an unexpected state.

Verify Mirrors are Down—This option expects to find the mirrors split and it will leave them split and perform the backup. If the mirrors are established at the time of backup, the backup will fail and report an error. This error is designed to ensure that the backup is taken for the specific point in time that the mirrored data represents.

Bring Mirrors Down if Needed—This option checks whether the mirrors are established or split and it will split the mirrors if they are established. If you select this option, the backup will not fail regardless of the state of the mirrors.

Bring Mirrors Down after Establishing—This option checks the mirrors and if they are not established, the EDM first establishes the mirror to ensure that it is an exact copy of data on the primary volume. Then the EDM splits the mirrors to perform the backup.

Post-Backup Mirror Policy

During post-backup processing, mirror management can be configured to do any of the following:

Bring Mirrors Up—After the restore is complete, the EDM automatically resynchronizes the mirror to the primary disk.

Leave Mirrors Down—After the restore is complete, the EDM leaves the mirrors split from the primary disk.

Leave Mirrors as Found—After the restore is complete, the EDM resynchronizes the mirrors to the primary disk if they were established to begin with. If not, the EDM leaves the mirrors split.

The invention includes a method for managing data that may be replicated across one or more computer systems. The method is carried out in the above-described environment by the Logic of this invention, which in a preferred embodiment is a program code in the Perl programming language as mentioned above.

The method includes the computer-executed steps of establishing one or more mirrored copies of data (BCV's) that are copies of one or more volumes of data (Standard Volumes). The BCV's are established in a conventional manner as described in the incorporated '497 patent. The BCV's are separated or split from the respective one more volumes of data in a conventional manner and which is also described in the incorporated '497 patent.

The Standard volumes are part of a volume group on the source computer system 113a that has an operating system 210a (FIG. 3). The operating system is preferably a Unix operating system, such as Solaris from Sun Microsystems of California, AIX from IBM of New York, or HP-UX from Hewlett Packard of California.

The method further includes discovering logical information related to the Standard volumes that are part of the volume group on the source computer system 113a. A map of the logical information to physical devices on the source computer system is created, preferably in the form of a flat file that may be converted into a tree structure for fast verification of the logical information. That map is used to build a substantially identical logical configuration on the target computer system 113b, preferably after the logical information has been verified by using a tree structure configuration of the logical information.

The logical configuration is used to mount a duplicate of the BCV's on the target computer system (denoted as mounted target BCV's). The newly mounted target BCV's then become part of a second volume group on the target computer system 113b that has an operating system 210b. The operating system is preferably a Unix operating system, such as Solaris from Sun Microsystems of California, AIX from IBM of New York, or HP-UX from Hewlett Packard of California.

The invention is particularly useful when data on the standard volumes and BCV's represents data related to an application 208a and/or application 208b, and in particular the invention is particularly useful if the application is a database, such as an Oracle database available from Oracle Corporation of Redwood, Calif.

Figure 4:
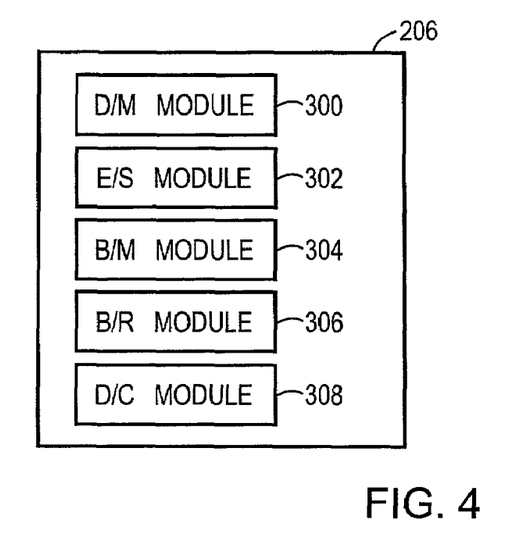
FIG. 4 is a representation of an embodiment of the logic of FIG. 1 and showing a preferred functional structure.

Referring to FIG. 4, the logic 206 includes program code that enables certain functions and may be thought of as code modules, although the code may or may not be actually structured or compartmentalized in modular form, i.e., this illustrated concept is more logical than physical. Accordingly, D/M module 300 serves a discovery/mapping function; E/S module 302 serves an establish/split function; B/M module 304 serves a build/mount function; B/R module 306 serves a backup/restore function; and D/C module 308 serves a dismount/cleanup function. Any of the functions may be accomplished by calling a procedure for running such a function as part of the data storage system and the backup system.

The discovery/mapping function, discovers and maps logical to physical devices on the source host 113a, and includes such information as physical and logical volumes, volume groups, and file system information. The establish/split function establishes BCV's or splits such from standard volumes, depending on the pre- and post-mirror policies in effect on source host 113a.

The build/mount function substantially exports the BCV's established on the source host 113a to the target host 113b. It creates volume group, logical volume, and file system objects on the target host computer system.

The backup/restore function performs backup of the target host BCV data that has been exported or migrated from the source host. The dismount/cleanup function removes all volume group, logical volume, and filesystem objects from the target host.

Method Steps of the Invention

Now for a better understanding of the method steps of this invention the steps are described in detail with reference to FIGS. 5-12.

Figure 5:
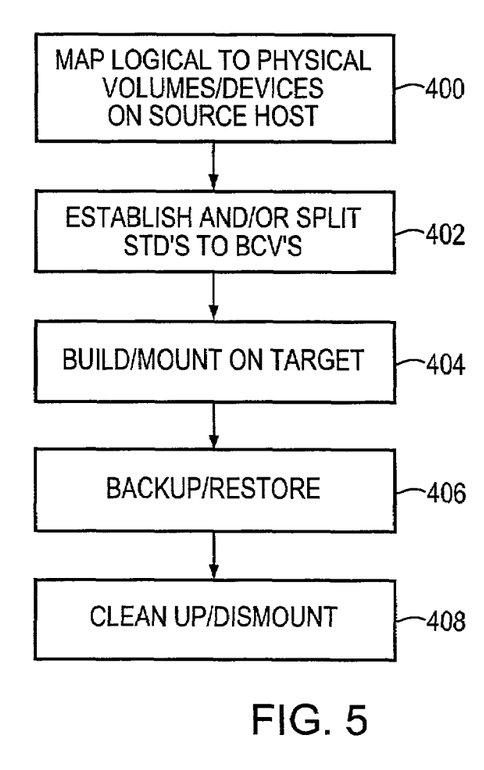
FIG. 5 is a representation of a general overview of the method steps of this invention.

FIG. 5 shows an overview of the entire process. In step 400 the logic 206 maps logical to physical devices on the source host. In a step 402, the logic establishes or splits standard to BCV's (which may be accomplished by a call to another function on the data storage system) in accordance with the mirror policy in effect at the source host. Step 404, logic builds and mounts on the target host so that the BCV's are exported or migrated to the target host. Step 406 is a step for Backup and/or Restore, as described in more detail below. Step 408 is a cleanup step in which all volume group logical volume, and filesystem objects are removed from the target server.

Figure 6:
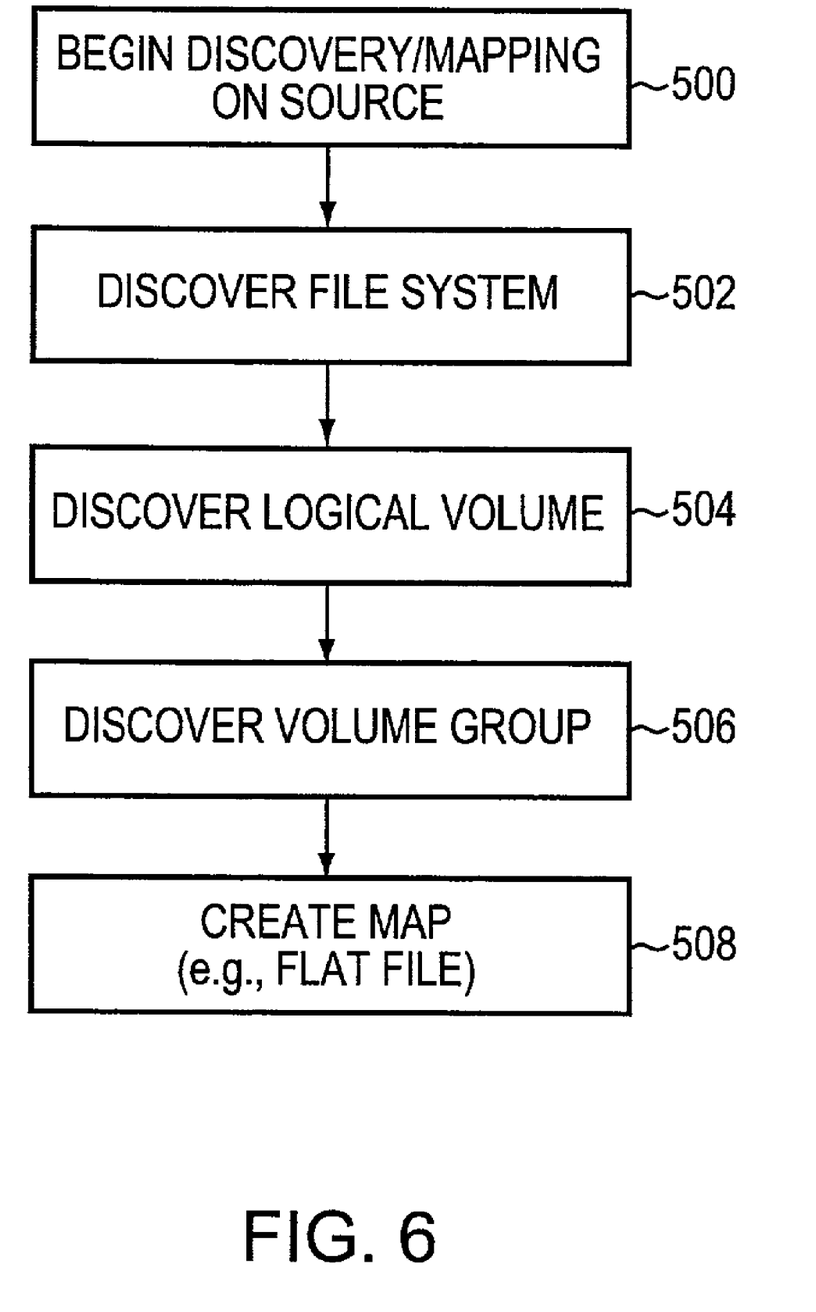
FIG. 6 is a flow logic diagram illustrating some method steps of the invention carried out by the logic of this invention that are generally part of the steps shown in FIG. 5.

FIG. 6 is an overview of the steps of the mapping and discovery process. Such processing begins in step 500. The filesystem is discovered on the source host in step 502. The logical volume is discovered in step 504. The volume group information is discovered on the source host in step 506. In step 508, the map is created preferably as a flat file because that is an efficient data structure for compiling and using the information.

For mapping purposes, in general, the method uses a data storage system input file. Preferably the input file is a three-column file that contains a list of the standard and BCV device serial numbers containing the data and the data copies respectively, and the physical address of the BCV devices.

The following is an example of this file:

TABLE 1

Example of data storage system input file

| Standard (STD) Device | BCV Dev |
|---|---|
| 7902C000 | 790B4000 |
| 7902D000 | 790B5000 |
| 7902E000 | 790B6000 |
| 7902F00 | 790B7000 |

An example of how such a map is created in the preferred embodiment for each of the preferred operating systems: Solaris, AIX, and HP-UX is now shown in tables 2-4, in the respective order mentioned.

TABLE 2

Mapping information for Sun Solaris:

Mapping file (for SUN Solaris)
The .std Mapping file is generated by a Unix-based call with the -std option flag. The .std Mapping file is a multi-columned file of information about the Standard devices
The columns may include:
1. Device Serial Number-from the Data Storage system input file
2. Physical Address (i.e., c0d0t1)
3. Volume Group
4. Logical Volume Name
5. File Type TABLE 2-continued Mapping information for Sun Solaris:

6. Mount Point
7. Serial Number
8. Device Type

The following is an example of a flat file using such information for a Solaris operating system:

3701F000  c1t0d0s2  testvg1  vol01  ufs/mir1
    947015961.1105.sunmir2 sliced
3701F000  c1t0d0s2  testvg1  vol02  ufs/mir2
    947015961.1105.sunmir2 sliced
37020000  c1t0d1s2  testvg1  vol01  ufs/mir1
    947015961.1105.sunmir2 sliced
37020000  c1t0d1s2  testvg1  vol02  ufs/mir2
    947015961.1105.sunmir2 sliced

TABLE 3

Mapping information for IBM AIX:

Mapping file (for IBM AIX)
The .std Mapping file is generated by a Unix-based call with the -std option flag. The .std Mapping file is a multi-columned file of information about the Standard devices
The columns may include:
1. Device Serial Number-from the Data Storage System
2. Physical Address (i.e., hdisk1)
3. Volume Group
4. Logical Volume Name
5. Volume Group Partition Size
6. File Type
7. Mount Point
8. Logical Volume Partition size
9. Logical Volume source journal log
10. Logical Volume number of devices striped over
11. Logical Volume Stripe size The following is an example of a flat file using such information for an AIX operating system:

37006000 hdisk1 testvg2-2 testvg2-lv01 4 jfs /testvg2/
    mntpt1 25 loglv02 N/A N/A
37006000 hdisk1 testvg2-2 testvg2-lv02 4 jfs /testvg2/
    mntpt1/mntpt2 25 loglv02 N/A N/A
37006000 hdisk1 testvg2-2 testvg2-lv03 4 jfs /testvg2-3 25
    loglv02 N/A N/A
37006000 hdisk1 testvg2-2 testvg2-lv04 4 jfs /testvg2-4 25
    loglv02 N/A N/A

TABLE 4

Mapping information for HP-UX:

Mapping file (for HP-UX)
The .std Mapping file is generated by a Unix-based call with the -std option flag. The .std Mapping file is a multi-columned file of information about the Standard devices
The columns may include:
1. Device Serial Number-from the data storage system input file
2. Physical Address (i.e., c0d0t1)
3. Volume Group
4. Logical Volume Name
5. Logical Volume Number
6. File Type
7. Mount Point The following is an example of a flat file using such information for a UX operating system:
7903A000 c3t8d2 vgedm2 lvt8d2 1 vxfs /t8d2
7903B000 c3t8d3 vgedm2 lvt8d3 2 vxfs /t8d3

7903C000 c3t8d4 vgedm2 lvt8d4 3 vxfs /t8d4
7903D000 c3t8d5 vgedm2 lvt8d5 4 vxfs /t8d5

Figure 7:
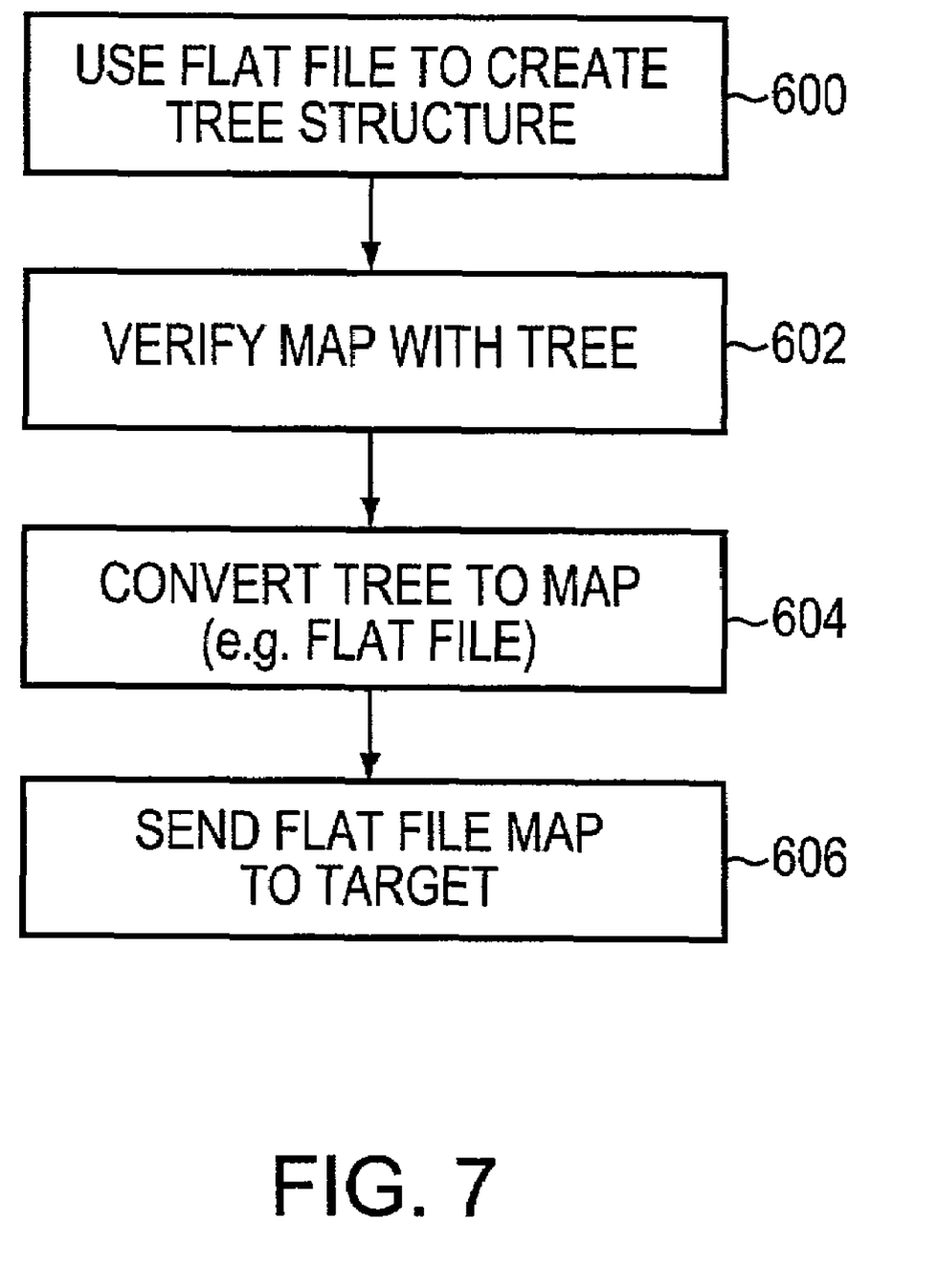
FIG. 7 is another flow logic diagram illustrating some method steps of the invention carried out by the logic of this invention that are generally part of the steps shown in FIG. 5.

Referring now to FIG. 7, step 600 uses the flat file to create a tree structure. This structure is preferably built by a unix function call from information in the mapping files described above. It may be built on both the target host computer system and the source host computer system. It is referred to as a tree because the Volume group information may be placed as the root of the tree and the branches represent the device information within the group and the logical volumes within the group. It is used in step 602 to verify the accuracy of the map file before the map file is sent to the target host. The tree is converted to a map preferably as a flat file in step 604. This flat file map is then sent back to the target in step 606.

Figure 8:
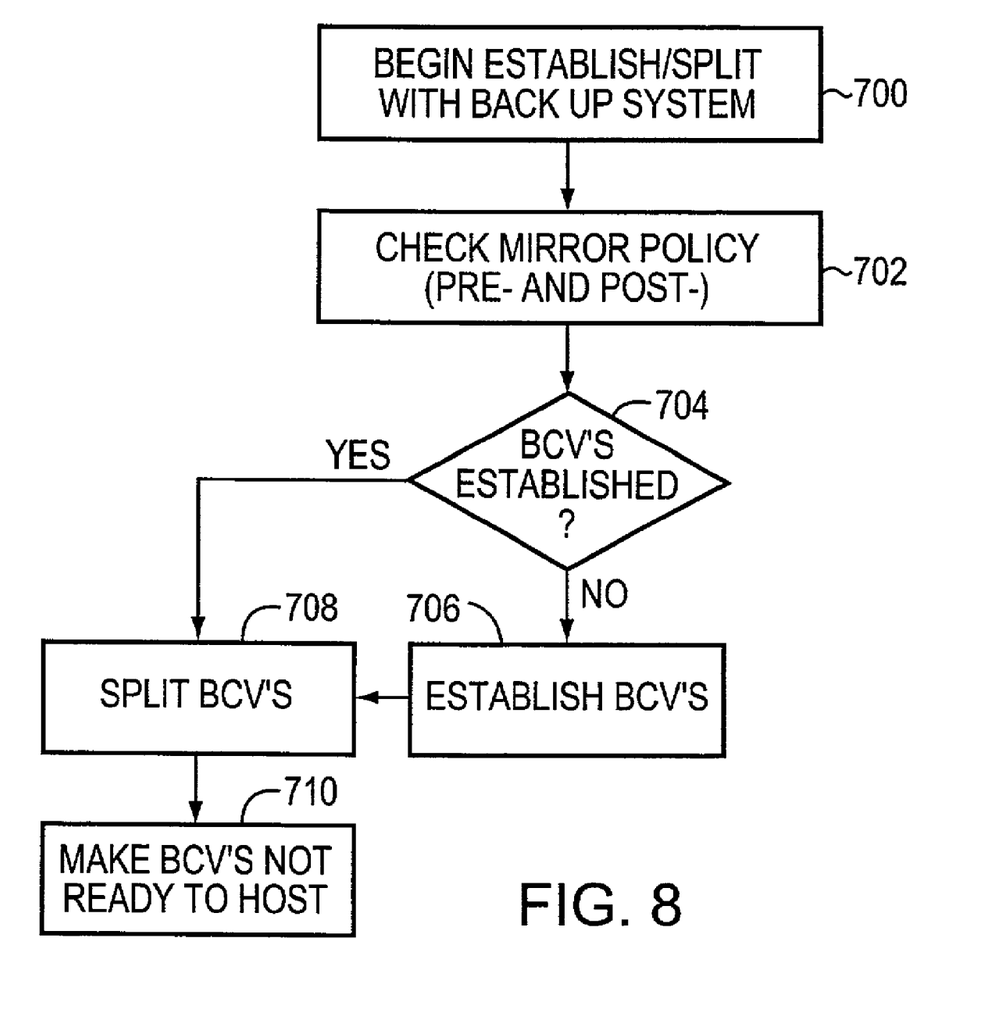
FIG. 8 is a flow logic diagram illustrating some method steps of the invention carried out by the logic of this invention that are generally part of the steps shown in FIG. 5.

Referring to FIG. 8, the process of establishing/splitting with a backup system is started in step 700. The mirror policy is checked in step 702. An inquiry is posed in step 704 to determine if BCV's are established in accordance with the mirror policy. If the answer is no then BCV's are established in step 706. The BCV's are split from the source host in step 708. The BCV's are made not ready to the host in step 710.

Figure 9:
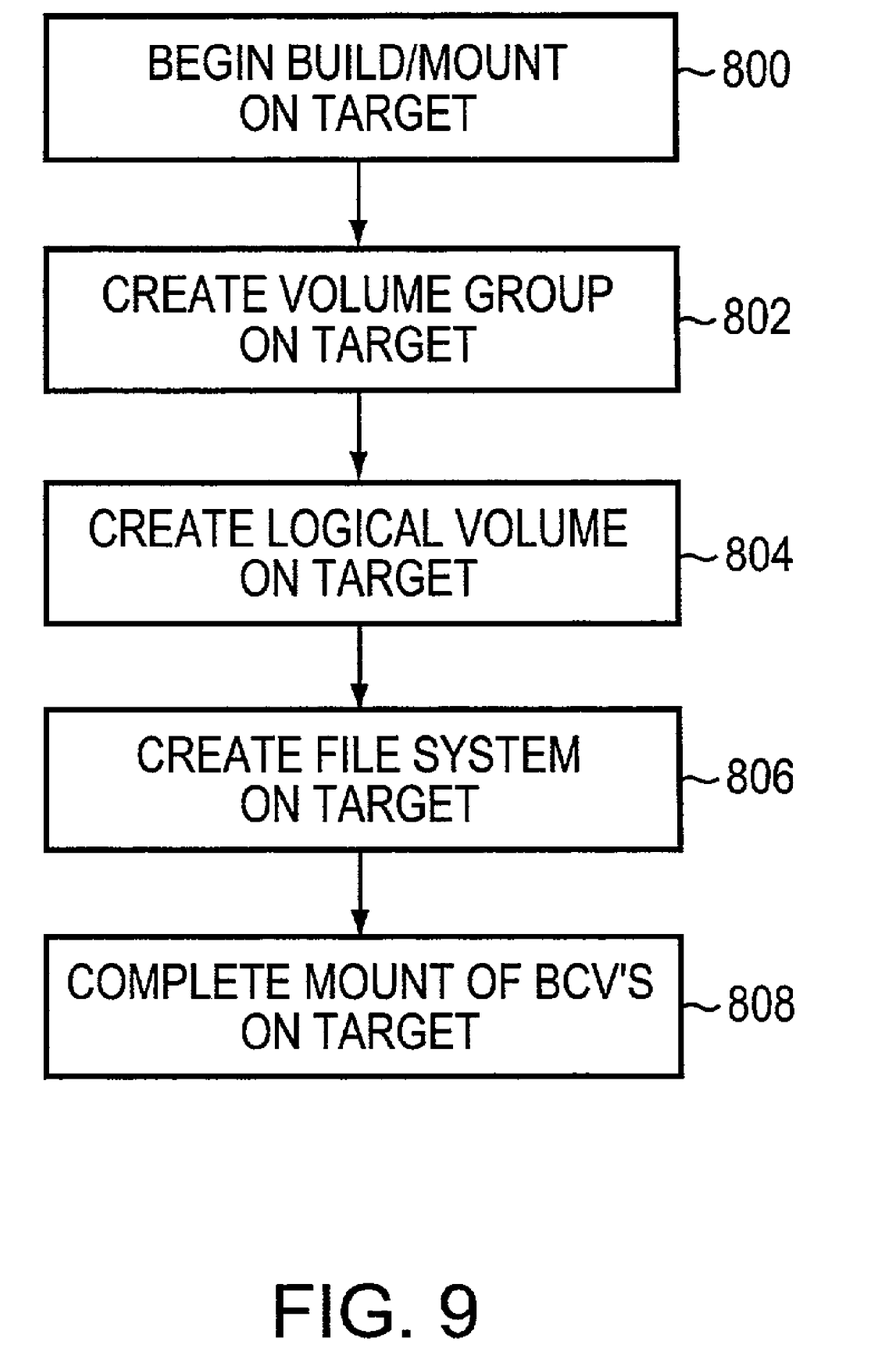
FIG. 9 is a flow logic diagram illustrating some method steps of the invention carried out by the logic of this invention that are generally part of the steps shown in FIG. 5.

Referring to FIG. 9, the process of beginning to build/mount logical information so the BCV's can be mounted on the target is begun in step 800. The volume groups are created on the target is step 802. Logical volumes are created on the target in step 804. The filesystem is created on the target in step 806. The device mount may now be completed with this logical information related to the BCV's on the target host in step 808.

Figure 10:
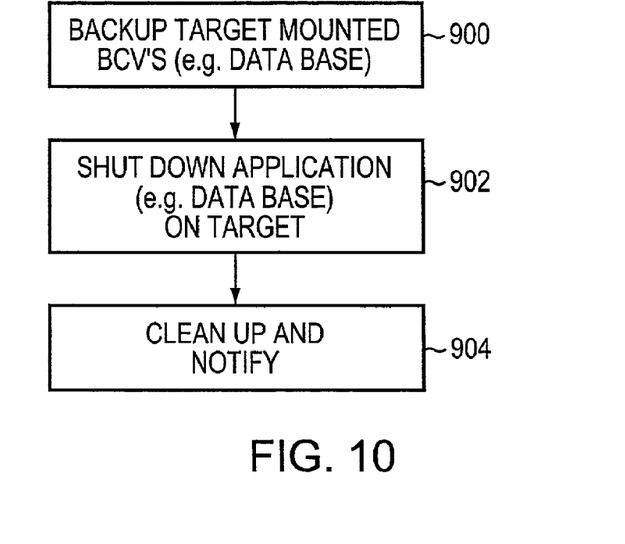
FIG. 10 is a flow logic diagram illustrating some method steps of the invention carried out by the logic of this invention that are generally part of the steps shown in FIG. 5.

Referring to FIG. 10, the newly mounted target BCV's may now be backed up in step 900. The application is then shut down on the target in step 902. And following the backup of the target BCV's cleanup steps as described in FIG. 12 and notification take place in step 904.

If the software application on the target host in the source host is a database, then information related to the data may also be backed up, with the effect that essentially the entire database is backed up. Important information from the database includes any transactional data performed by the database operations, and related control files, table spaces, and archives/redo logs.

Regarding databases, these are other terminology are now discussed. The terminology is described with reference to an Oracle database because that is the preferred embodiment but one skilled in the art will recognize that other databases may be used with this invention.

Control files contain important information in the Oracle database, including information that describes the instance where the datafiles and log files reside. Datafiles may be files on the operating system filesystem. A related term is tablespace that is the lowest logical layer of the Oracle data structure. The tablespace consists of one or more datafiles. The tablespace is important in that it provides the finest granularity for laying out data across datafiles.

In the database there are archive files known as redo log files or simply as the redo log. This is where information that will be used in a restore operation is kept. Without the redo log files a system failure would render the data unrecoverable. When a log switch occurs, the log records in the filled redo log file are copied to an archive log file if archiving is enabled.

Figure 11:
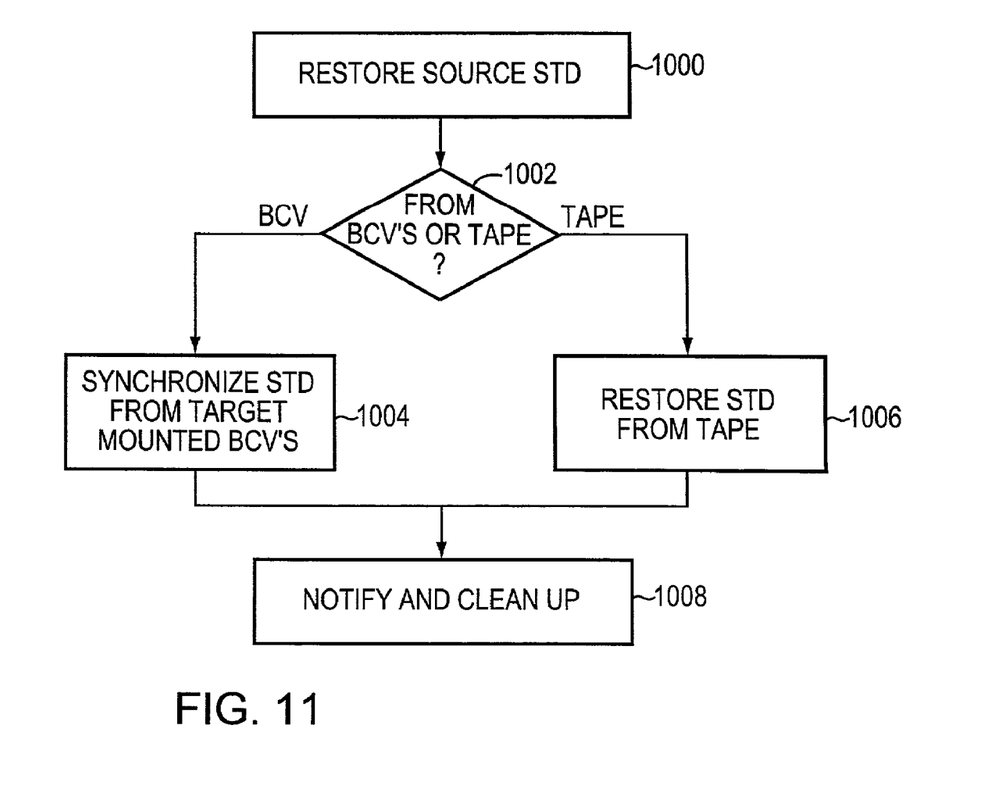
FIG. 11 is a flow logic diagram illustrating some method steps of the invention carried out by the logic of this invention which are generally part of the steps shown in FIG. 5.

Referring now to FIG. 11, the process for restoring source standard volumes is shown beginning at step 1000. Step 1002, poses an inquiry to determine if the restore is to be from the BCV's on the target or tape. In accordance with the answer the standard volumes are synchronized or restored from the target mounted BCV's or tape, respectively in steps 1004 or 1006. Step 1008 begins the notification and cleanup steps that are generally described in FIG. 12.

Figure 12:
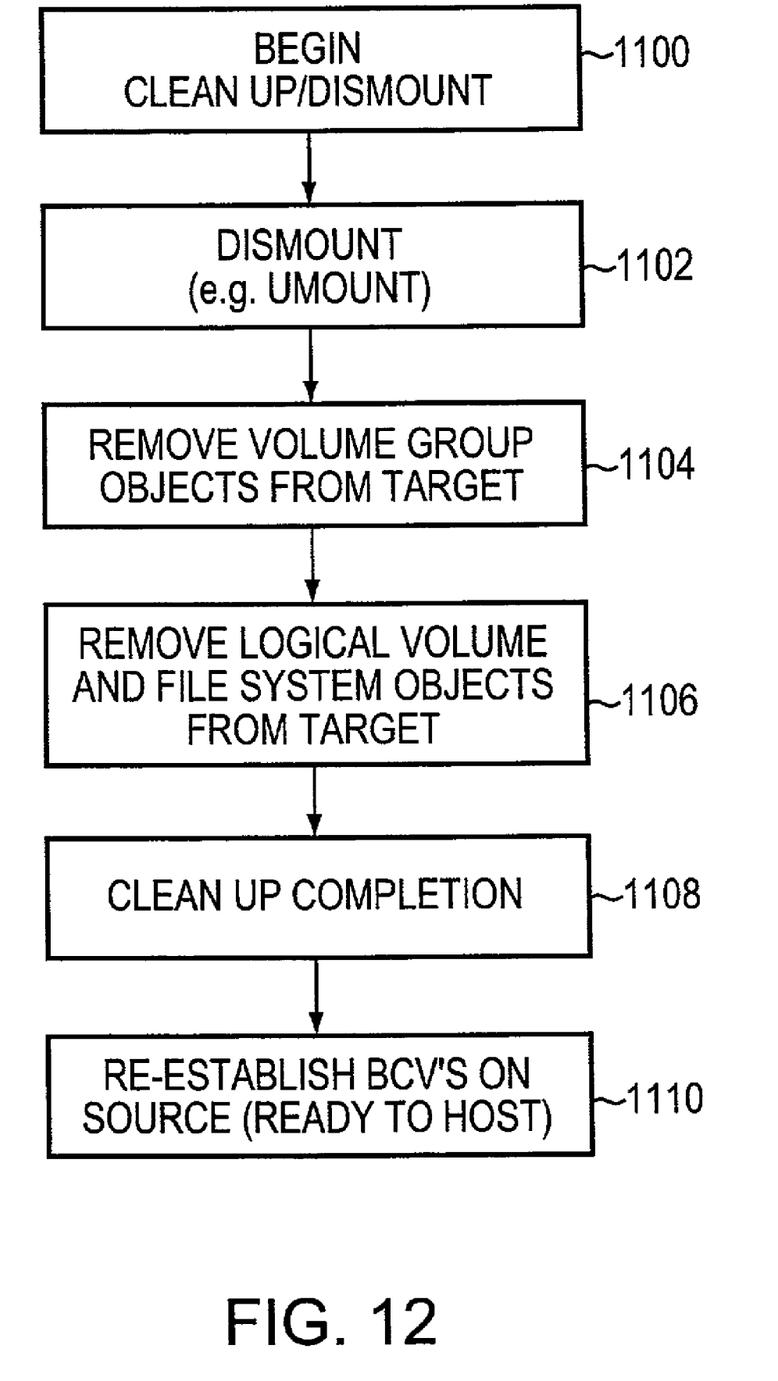
FIG. 12 is a flow logic diagram illustrating some method steps of the invention carried out by the logic of this invention that are generally part of the steps shown in FIG. 5.

The cleanup/dismount process begins in step in 1100 as shown in FIG. 12. The BCV's are dismount from the target in step 1102. This may be accomplished for example with the UNIX umount command. The objects related to volume group, logical volume, and filesystem or move the target in steps 1104 and 1106. The cleanup is completed in step 1108. The BCV's are re-established on the source (i.e., made ready to the host) in step in 1108.

A system and method has been described for managing data that may be replicated across one or more computer systems. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for managing data that may be replicated from one or more volumes of data that are part of a first volume group on a first computer system having a first internal logical volume, and first filesystem, the method comprising the computer-executed steps of:

discovering logical information related to the one or more volumes of data that are part of the first volume group on the first computer system;

creating a map of the logical information to physical devices on the first computer system, the map defining a first logical configuration comprising:

information identifying one or more devices associated with one or more physical volumes containing the data, including device serial number, physical address of the device, volume group, logical volume name, file type, and mount point;

information providing definition and structured layout of the first volume group, first internal logical volumes and first file system on the first computer system;

using the map to create a second volume group on a second computer system where the logical configuration of the second volume group is identical to the first logical configuration of the first volume group, including identical volume layout and file system structure as defined by mapping information originally built on the first computer system;

using the map to reconstruct on the second computer system the internal logical volumes and file systems of the first computer system; and mounting a duplicate of the one or more volumes of data of the first computer system to the second volume group of the second computer system.

2. The method of claim 1, wherein the first computer system is a separate and distinct computer system from the second computer system.

3. The method of claim 1, further comprising creating volume group, logical volume, and file system objects on the second computer system.

4. The method of claim 1, wherein the map further comprises at least one set of information selected from the group consisting of information relating to one or more filesystems associated with the volumes of data, device serial number, physical address, volume group, logical volume name, file type, and mount point.

5. The method of claim 1, wherein the map is configured as a flat file that is converted into a tree structure and further comprising the computer-executed step of using the tree structure to verify the accuracy of the information related to the map of the first volume group and the other logical information associated with the first computer system.

6. The method of claim 5, wherein the tree structure is converted back into a map that is sent to the second computer system.

7. The method of claim 1, wherein the first computer has a first operating system and wherein the second computer has a second operating system, wherein the first and second operating systems are selected from the group consisting of IBM AIX, Sun Solaris, and HP UX, and the computer-executed steps may be performed substantially independent of which operating system is selected from the group.

8. The method of claim 7, wherein the first operating system is different from the second operating system.

9. The method of claim 7, wherein the first operating system is substantially the same as the second operating system.

10. The method of claim 1, further comprising the computer-executed steps of:
establishing one or more mirrored copies of data that are copies of one or more volumes of data that are part of the first volume group; and
separating the one or more mirrored copies of data from the respective one more volumes of data.

11. The method of claim 10, wherein the map further comprises: information identifying the one or more separated mirrored copies of the data; and information identifying the physical address(es) of the mirrored copies.

12. The method of claim 10, further comprising the computer-executed step of:
backing up the separated one or more mirrored copies of data to a backup storage system in operable communication with the first and second computer systems.

13. The method of claim 12, further comprising the computer-executed step of:
restoring one or more volumes of data from the backup storage system or from the one or more mirrored copies of data that are copies of the one or more volumes of data that are part of the first volume group.

14. The method of claim 10, further comprising the computer-executed step of mounting the separated one or more mirrored copies of data on the first or second computer system using the second volume group.

15. The method of claim 14, wherein the first and second computer systems share a data storage system, where the first volume group and the second volume group are both part of the data storage system.

16. The method of claim 14, further comprising the computer-executed step of:
dismounting the separated one or more mirrored copies from the second computer system.

17. The method of claim 10, wherein the respective one or more volumes of data that are part of the first volume group on the first computer system are further associated with a first software application.

18. The method of claim 17, wherein a second software application is provided on the second computer system and the separated one or more mirrored copies of data on the second computer system are associated with the second software application.

19. The method of claim 18, further comprising the computer-executed step of:
backing up the separated one or more mirrored copies of data to a backup storage system in operable communication with at least one of the first and second computer systems.

20. The method of claim 19, wherein the second software application has an associated database and the step of backing up the separated one or more mirrored copies of data to the backup storage system includes backing up the associated database.

21. The method of claim 20, wherein there is a set of information associated with the database, the set of information comprising at least one type of information selected from the group consisting of tablespaces, archive logs, redo logs, and control files, and wherein at least some of the set of information associated with the database is backed up to the backup storage system during the backup step.

22. The method of claim 21, further comprising the step of:
restoring, from the separated one or more mirrored copies of data, the respective one or more volumes of data associated with the separated one or more mirrored copies of data, and wherein at least some of the set of information associated with the database is used during this step.

23. A computer system for managing data that may be replicated from one or more volumes of data, the computer system comprising:
a data storage system including a plurality of storage devices;
first and second computer systems in communication with the data storage system, the first computer system having a first operating system and the second computer system having a second operating system, wherein the first computer system has data that may be replicated from one or more volumes of data that are part of a first volume group on the first computer system; and
a backup storage system in operable communication with the data storage system and the first and second computer systems, the backup storage system comprising computer-executable logic that enables the method steps of:
discovering logical information related to the one or more volumes of data that are part of the first volume group on the first computer system;
creating a map of the logical information to physical devices on the first computer system the map defining a first logical configuration comprising:
information identifying the devices associated with one or more physical volumes containing the data, including device serial number, physical address of the device, volume group, logical volume name, file type, and mount point; and,
information providing definition and structured layout of the first volume group, first internal logical volumes and first file systems on the first computer system;
using the map to create a second volume group on a second computer system, where the logical configuration of the second volume group is identical to the first logical configuration of the first volume group, including identical volume layout and file system structure as defined by mapping information originally built on the first computer system; and
using the map to reconstruct on the second computer system the internal logical volumes and file systems of the first computer system; and
mounting a duplicate of the one or more volumes of data of the first computer system to the second volume group of the second computer system having a second operating system.

24. The computer system of claim 23, wherein the first operating system is different from the second operating system.

25. The computer system of claim 23, wherein the first operating system is substantially the same as the second operating system.

26. The computer system of claim 23, wherein the first computer system is a separate and distinct computer system from the second computer system.

27. The system of claim 23, wherein the first and second operating systems are selected from the group consisting of IBM AIX, Sun Solaris, and HP UX, and the computer-executed steps may be performed substantially independent of which operating system is selected from the group.

28. The system of claim 23, wherein the first and second computer systems share the data storage system, where the first volume group and the second volume group are both part of the data storage system.

29. The system of claim 23, wherein the map is configured as a flat file that is converted into a tree structure and further comprising the computer-executed step of using the tree structure to verify the accuracy of the information related to the map of the first volume group and the other logical information associated with the first computer system.

30. The system of claim 29, wherein the tree structure is converted back into a map that is sent to the second computer system.

31. The system of claim 23, further comprising the computer-executed steps of:
  establishing one or more mirrored copies of data that are copies of one or more volumes of data that are part of the first volume group; and
  separating the one or more mirrored copies of data from the respective one more volumes of data.

32. The system of claim 31, further comprising the computer-executed step of:
  backing up the separated one or more mirrored copies of data to the backup storage system.

33. The system of claim 31, further comprising the computer-executed step of:
  restoring one or more volumes of data from the backup storage system or from the one or more mirrored copies of data that are copies of the one or more volumes of data.

34. The system of claim 31, further comprising the computer-executed step of mounting the separated one or more mirrored copies of data on the first or second computer system using the second volume group.

35. The system of claim 34, further comprising the computer-executed step of:
  dismounting the separated one or more mirrored copies from the second computer system.

36. The system of claim 31, wherein the map further comprises: information identifying the one or more separated mirrored copies of the data; and information identifying the physical address(es) of the mirrored copies.

37. A program product for use with a data storage system having a plurality of storage devices and which is in communication with first and second computer systems, the program product being for management of data and being comprised of:
  computer-executable logic contained on a computer-readable storage medium and which is configured for causing the following computer-executed steps to occur:
    establishing one or more mirrored copies of data that are copies of one or more volumes of data that are part of a first volume group on a first computer system having a first operating system;
    separating the one or more mirrored copies of data from the respective one more volumes of data;
    discovering logical information related to the one or more volumes of data that are part of the volume group on the first computer system;
    creating a map of the logical information to physical devices on the first computer system, the map defining a first logical configuration comprising:
      information identifying the devices associated with one or more physical volumes containing the data, including device serial number, physical address of the device, volume group, logical volume name, file type, and mount point; and
      information providing definition and structured layout of first volume group, first internal logical volumes and first file systems on the first computer system;
    using the map to create a second volume group on a second computer system, where the second logical configuration of the second volume group is identical to the first logical configuration of the first volume group, including identical volume layout and file system structure as defined by mapping information originally built on the first computer system;
    using the map to reconstruct on the second computer system the internal logical volumes and file systems of the first computer system; and
    mounting a duplicate of the one or more mirrored copies of data of the first computer system to the second volume group of the second computer system.

38. The program product of claim 37, wherein the map further comprises: information identifying the one or more separated mirrored copies of the data; and information identifying the physical address(es) of the mirrored copies.

39. The program product of claim 37, wherein first computer has a first operating system and wherein the second computer has a second operating system, wherein the first operating system is different from the second operating system.

* * * * *